July 30, 1929.  I. M. NUSS  1,722,939
QUICK ADJUSTING AUTO SEAT
Filed Feb. 21, 1928  2 Sheets-Sheet 2
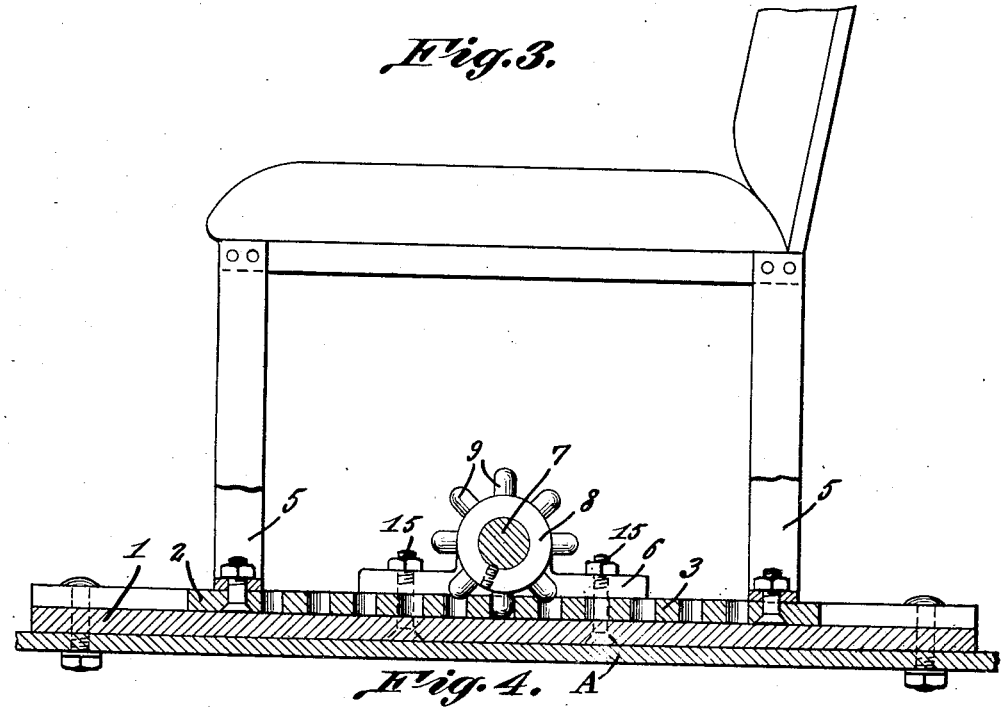
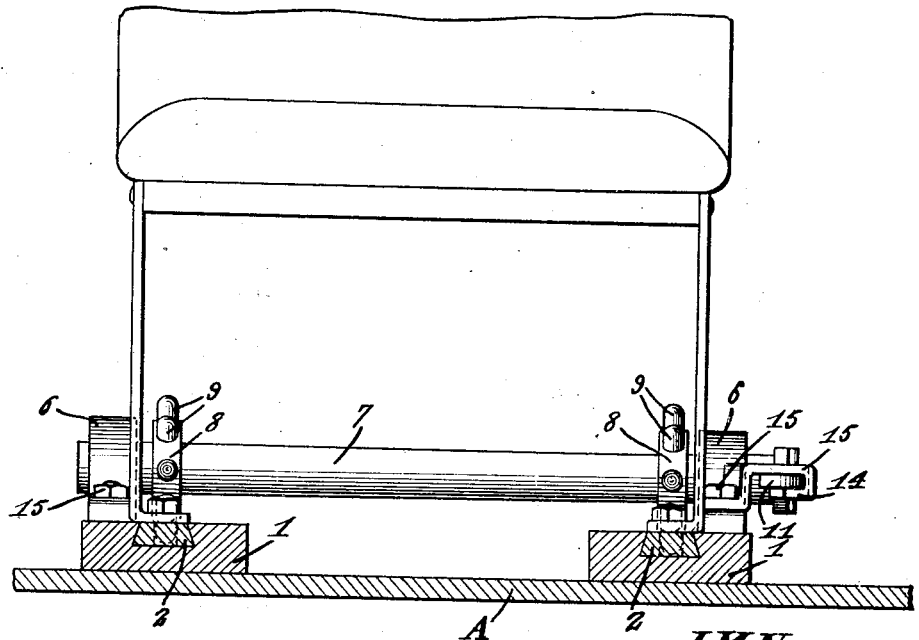

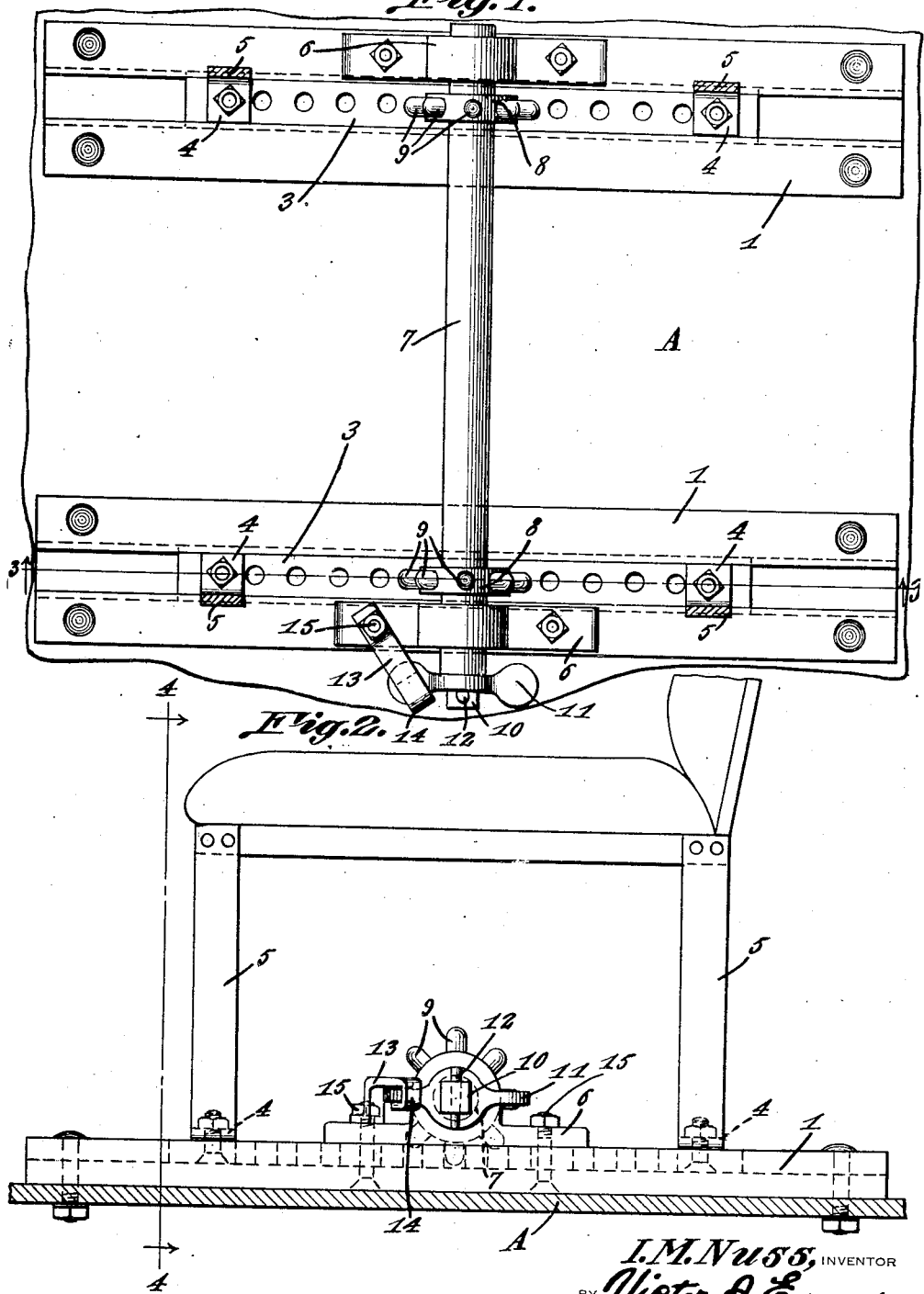

Patented July 30, 1929.

1,722,939

UNITED STATES PATENT OFFICE.

ISAAC MILLER NUSS, OF BLOOMSBURG, PENNSYLVANIA.

QUICK-ADJUSTING AUTO SEAT.

Application filed February 21, 1928. Serial No. 256,040.

This invention relates to vehicles, and its general object is to provide a seat for motor vehicles, that is adjustable in an easy and expeditious manner and with very little effort.

A further object of the invention is to provide a seat for automobiles and the like, that can be adjusted in a horizontal plane and be retained in any of its adjusted positions.

Another object of the invention is to provide an adjustable seat for automobiles, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a horizontal sectional view showing parts in plan of the adjusting mechanism of my seat.

Figure 2 is a fragmentary side elevation of the seat forming the subject matter of the present invention and showing the same in applied position in a motor vehicle.

Figure 3 is a sectional view taken approximately on line 3—3 of Figure 1 looking in the direction of the arrows.

Figure 4 is a sectional view taken approximately on line 4—4 of Figure 2 looking in the direction of the arrows.

Referring to the drawings in detail, the letter A indicates the floor of a motor vehicle and which has bolted or otherwise secured thereto a pair of base members 1, each of which is provided with a slot of substantially dovetail formation in cross section, as best shown in Figure 4 of the drawings.

Mounted for slidable movement in the slots of the base members are strips 2 which are formed for fitting engagement with the slots and fixed to the upper side of the strips are rack bars 3 having openings disposed centrally therein and in row formation as best shown in Figure 1 of the drawings. The strips have also secured thereto the feet 4 of legs 5 of the seat which may be provided with a seat and back portion of any desired construction.

Secured to the base members upon the outer sides of the slots thereof are bearing blocks 6 having journaled therein the ends of a shaft 7 which has secured thereto a pair of cog wheels 8 arranged thereon in a manner whereby the cogs 9 thereof will be received in the openings of the rack bars 3. One of the ends of the shafts 7 terminates in a reduced cross sectional square shank 10 to receive a handle 11 which is fixed thereon through the instrumentality of a pin 12. The handle is adapted for the purpose of rotating the shaft and it is desired to adjust the seat as will be apparent and in order to prevent rotation of the shaft, I have provided a locking member 13 which includes a hooked end 14 while its opposite end is pivotally secured to one of the bolts 15 which secures one of the bearing blocks 6 to the base members 1.

From the above description and disclosure of the drawings, it will be obvious that when the handle 11 is rotated, such movement will be imparted to the shaft 7 and thereby cause the seat to be moved in a horizontal plane so that the same will be adjusted accordingly and due to the locking member 13, the seat can be retained in any of its adjusted positions.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An adjustable seat adapted for use in motor vehicles comprising a pair of base members in the form of beams adapted to be bolted to the floor of the vehicle, said members having longitudinal dove-tail slots therein, strips conforming to the shape of the slot mounted for slidable movement therein, rack bars secured to said strips, said rack bars being provided with a plurality of spaced openings, a seat fixed to said strips, a bearing block secured to each base member, a shaft mounted for rotation in said bearing block, a pair of cog wheels on said shaft, each cog wheel having radial cogs thereon, having rounded ends adapted to extend into the spaced openings in each rack bar, said shaft extending completely thru said bearing block and one end thereof having a handle in the form of a wing nut, a locking member pivoted to one of said bearing blocks, said locking member having a hooked end adapted to engage said wing nut for retaining the shaft in a predetermined position.

In testimony whereof I affix my signature.

ISAAC MILLER NUSS.